No. 619,226.  
F. RITTER.  
DENTAL CHAIR.  
(Application filed Aug. 25, 1897.)  
Patented Feb. 7, 1899.
(No Model.)  
4 Sheets—Sheet 1.
Fig. 1
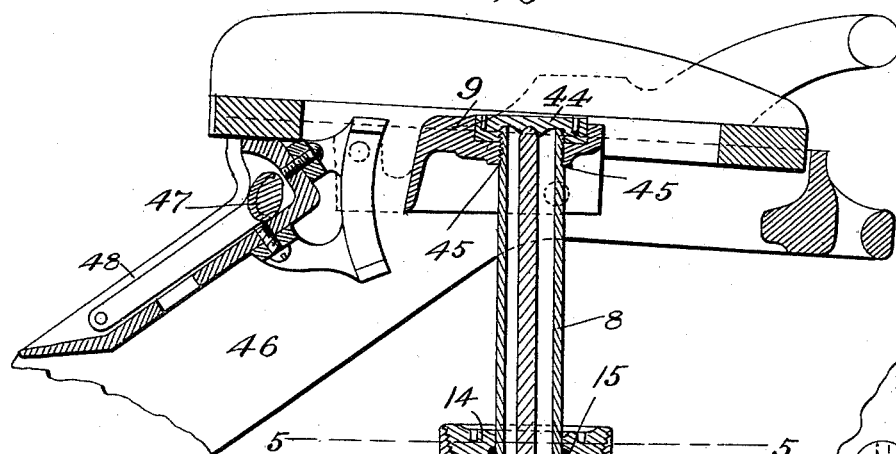
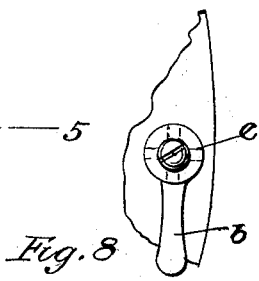
Fig. 8
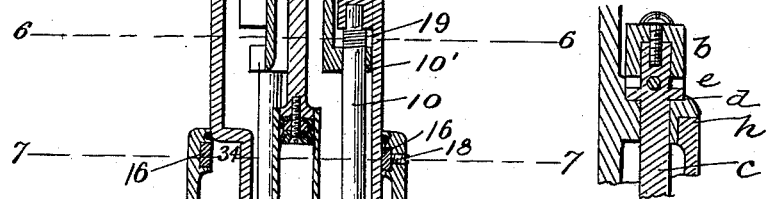
Fig. 9.
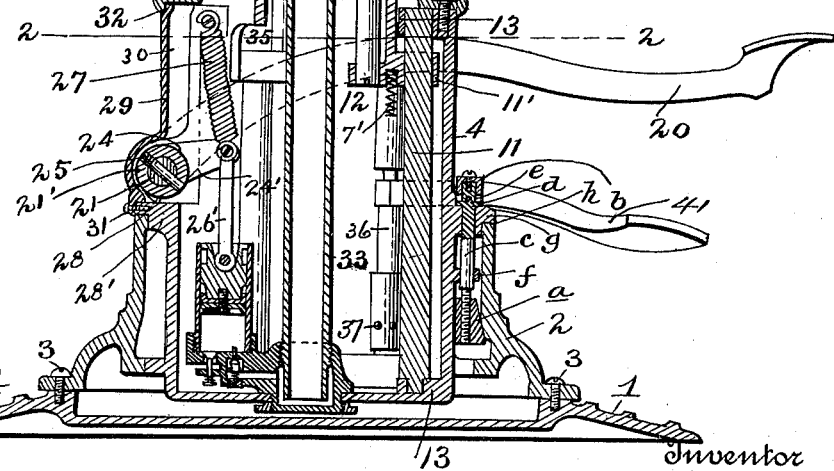
Witnesses  
Franck L. Ourand.  
C. M. Catlin.
Inventor  
Frank Ritter  
by Benj. R. Catlin  
Attorney No. 619,226. Patented Feb. 7, 1899.
F. RITTER.
DENTAL CHAIR.
(Application filed Aug. 25, 1897.)
(No Model.) 4 Sheets—Sheet 2.
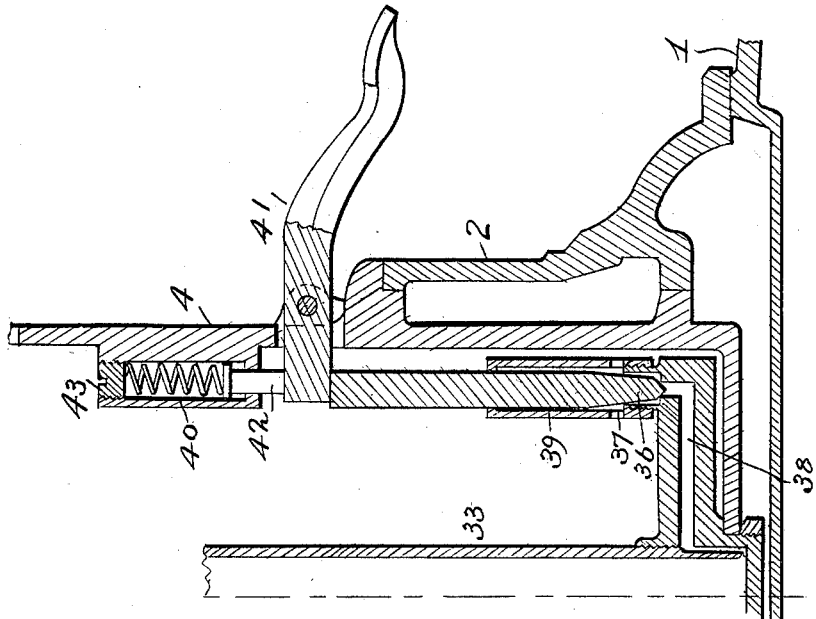
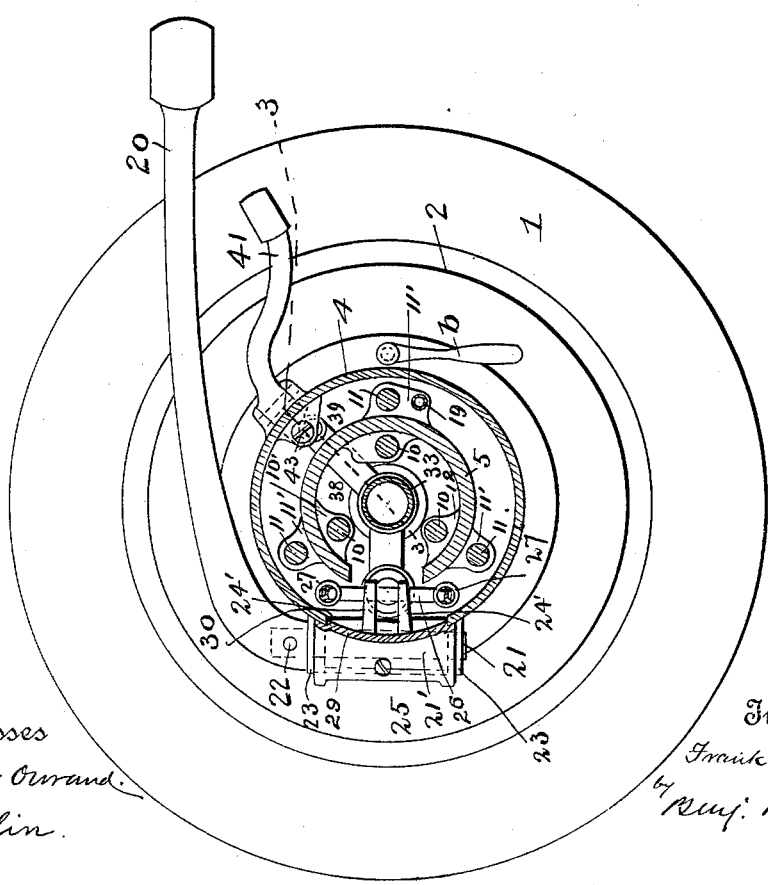

No. 619,226. Patented Feb. 7, 1899.
F. RITTER.
DENTAL CHAIR.
(Application filed Aug. 25, 1897.)
(No Model.) 4 Sheets—Sheet 3.

Witnesses
Franck L. Ouvand.
C. M. Catlin.

Inventor
Frank Ritter
by Benj. R. Catlin
Attorney

No. 619,226.　　　　　　　　　　　　　　　　Patented Feb. 7, 1899.
F. RITTER.
DENTAL CHAIR.
(Application filed Aug. 25, 1897.)
(No Model.)　　　　　　　　　　　　　　　　4 Sheets—Sheet 4.
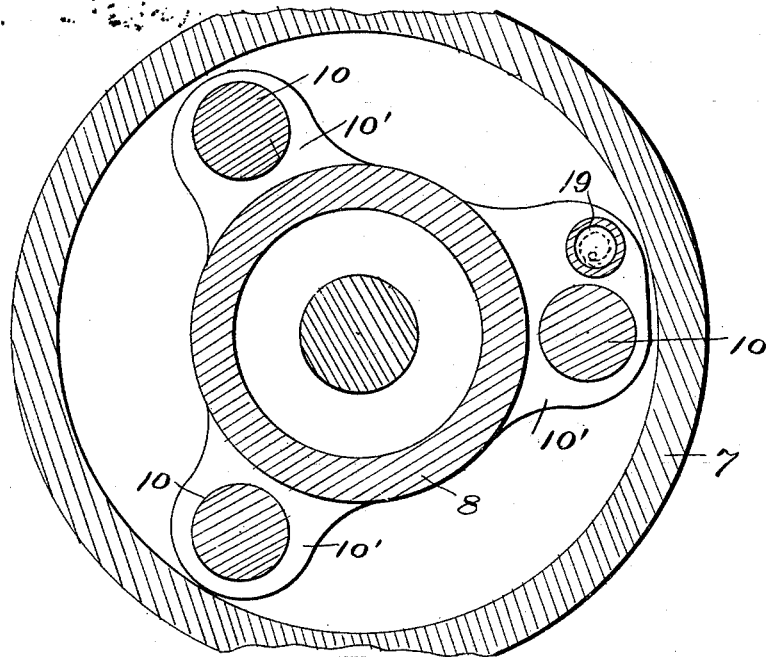
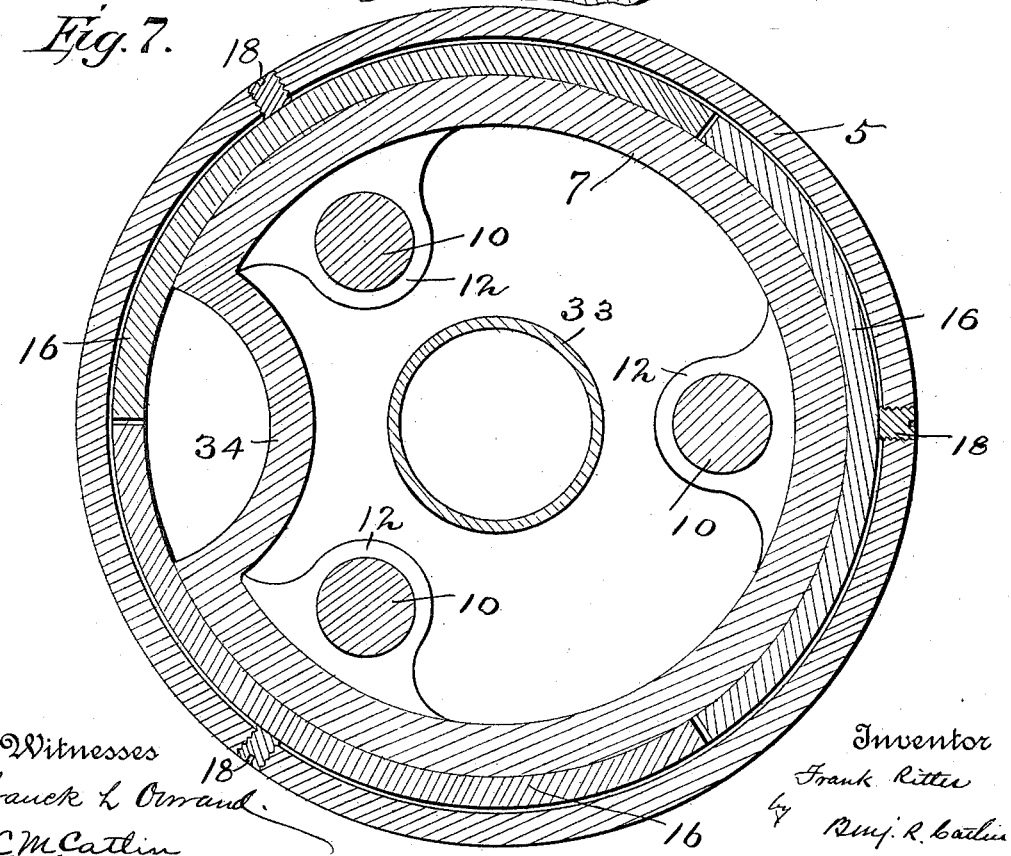
Witnesses
Franck L. Orrand.
C. M. Catlin
Inventor
Frank Ritter
by Benj. R. Catlin
Attorney

UNITED STATES PATENT OFFICE.

FRANK RITTER, OF ROCHESTER, NEW YORK.

DENTAL CHAIR.

SPECIFICATION forming part of Letters Patent No. 619,226, dated February 7, 1899.

Application filed August 25, 1897. Serial No. 649,422. (No model.)

*To all whom it may concern:*

Be it known that I, FRANK RITTER, a resident of Rochester, in the county of Monroe and State of New York, have invented certain new and useful Improvements in Dental Chairs; and I do hereby declare the following to be a full, clear, and exact description of the invention, such as will enable others skilled in the art to which it pertains to make and use the same.

The invention relates to dental chairs, and has for its object to increase their stability, compactness, ease of operation, and efficiency.

The invention consists in the construction hereinafter described and pointed out.

Figure 5:
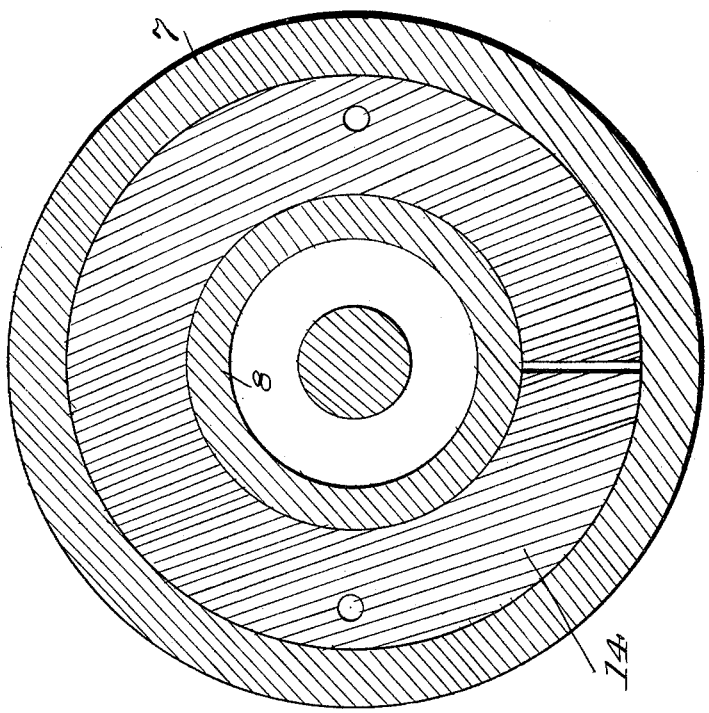
Figure 4:
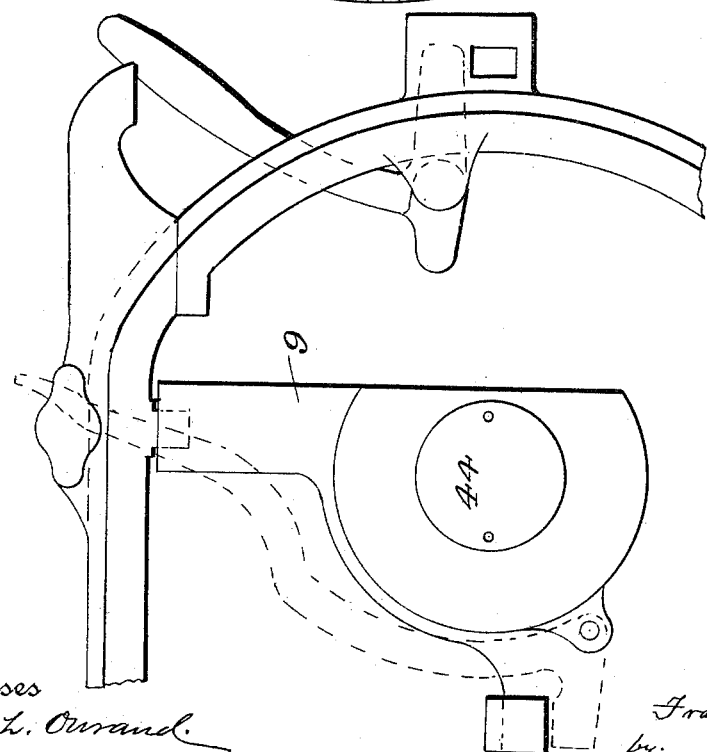

In the accompanying drawings, Figure 1 is a vertical section of a chair base, pedestal, and seat elevating mechanism. Fig. 2 is a section on line 2 2 of Fig. 1. Fig. 3 is a section on line 3 3 of Fig. 2. Fig. 4 is a partial plan of the seat-frame and cross-bar. Figs. 5, 6, and 7 are sections on the lines 5 5, 6 6, and 7 7, respectively, of Fig. 1. Fig. 8 is a plan of a bar for operating a locking device, and Fig. 9 is a partial section of said bar and locking device.

Numeral 1 denotes the bottom, and 2 an approximately cylindrical body, of a chair-base, said parts of the base being fixed to each other by screws 3.

4 denotes a lower part of a chair-pedestal. This pedestal-section has a closed bottom and serves as an oil-holder. 5 is an extension fixed to part 4 by screws 6. The pedestal has an exterior annular projection $g$, whereby it rests rotatably on the base, and the base and pedestal may at will be fastened in fixed relation to each other by a wedge-shaped block $a$, operated by a lever $b$, secured by a screw to the top of a short rod $c$, having a screw-thread connection with the block $a$. The rod fits a socket in the end of the lever and is further fixed thereto by a transverse pin $d$. In the walls of this socket on the under side are a series of slots $e$, oppositely situated to fit over the pin and thus connect the rod and bar. These slots provide for different adjustments of the lever to compensate for wear.

$f$ is a guide for the rod $c$.

$g$ is a projection fixed to the pedestal, and it also receives and guides the rod.

A slight movement of lever $b$ raises or lowers the wedge-block either to tighten or loosen the connection between the base and pedestal. When the wedge is raised, the shoulder $h$ of the pedestal projection is simultaneously forced down upon the edge of the base.

7 is a movable extension of the pedestal.

8 is a movable tube fixed to the cross-bar 9 of the seat-frame.

The tube 8 and movable pedestal extension 7 are elevated in the usual manner by a pump, and they are telescopically connected with each other and with the fixed pedestal-section, and these movable parts are guarded against independent lateral movements and against all binding action by rods 10 and 11. The rods are fixed in flanges or projections 12 and 13, formed on the interior of the pedestal-sections. The rods 10 each fit an opening in a flange or projection 10' on the seat-tube 8, and the foot of said tube is accurately guided by the rods and held horizontally in fixed relation to the pedestal-section 7. These rods obviate the use of keys and keyways heretofore employed. The rods 11 in like manner fit suitable openings in the flanges or projections 11' on the foot of the pedestal-section 7, and the foot of said section is guided by the said rods. At the foot of pedestal-section 7 is a pendent spring 7', adapted to obviate jar when said tube reaches the bottom of the reservoir. The seat-tube is also guided and steadied by a frusto-conical split plug 14, which has a central opening receiving said tube. In the wall of the opening is a lubricating-packing 15. The construction is such that the plug can be screwed up or down in its seat in the tube 7 to insure its fitting the seat-tube suitably. The plug can also be removed to permit the introduction of the foot of the seat-tube into the pedestal-tube 7 in assembling the parts, or the seat-tube can be introduced from below without removing this plug.

16 denotes a packing-ring comprising three separate sections movably held in a recess formed in the inside of the pedestal-section, and 18 are screws for setting the ring-sections up against tube 7. These can be manipulated to nicely center the bearing and regulate the friction. Each section is separately adjustable.

19 indicates a spring seated in a flange 10' and between it and a flange 12 to prevent jar when the seat ascends.

20 denotes a foot-lever fixed to a short rod 21 by a pin 22. Said rod has bearings in the wings or projections 23 of the pedestal and constitutes the fulcrum of the pump-lever. 24 is the short member of the lever, having parallel arms 24', and 25 is a screw for fixing a sleeve 21' of said lever member to the rod 21. The lever supports in its arms 24 a rod 26, to which at its middle point is loosely connected the upper end of piston-rod 26' of a pump. Returning-springs are denoted by 27. These are attached to the ends of rod 26 and to the fixed pedestal-section. The projection or stop 28 is shown in Fig. 1 as held against said part by the action of the springs.

28 denotes a projection upon the lever to arrest the same and stop the returning action of the springs whenever said projection engages the part 28' of the pedestal.

29 is a detachable cover fitting an opening 30 in the pedestal-wall and held thereto by screws 31. The upper part of the cover or door 29 engages a flange or rib 32 at the top of the opening 30. This opening provides for inspection and repairs within the pedestal and reservoir. The cover excludes dust and maintains the symmetry of the pedestal. The fulcrum of the lever extends outside the pedestal and fits bearings therein closely to avoid entrance of dust.

33 denotes a fixed piston-tube. In order to provide space for the pump and other parts without enlarging the base and reservoir laterally and without interfering with the descent of the pedestal extension 7, the wall of said extension is inset at 34 and said inset portion cut off at its bottom, as shown at 35. This permits the foot of tube 7 to drop below the main part of the pump-cylinder, though the latter is situated partly within the circumference of the upper part of the tube. The cutting away of the inset at 35 provides that when the tubes are assembled the inset will not prevent turning the tubes and their flanges, so that the openings in the latter may register.

The seat is raised by pumping oil into the tubes, as usual.

36 denotes a valve, which is opened to permit the oil to return to the reservoir and lower the seat.

37 are oil-outlets, and 38 is an oil-escape passage, whereby oil flows to the reservoir when the valve is raised.

39 is a valve-stem guide.

40 is a spring normally closing the valve, and 41 a spring-compressing lever.

42 is a movable plug or piston held loosely on the lever 41 by the spring.

43 is a screw-plug to adjust the tension of the spring.

To enable the seat to be adjusted horizontally with respect to its support, the seat-tube 8 is fastened to the cross-bar by a nut 44, screwing upon the tube and forcing the said bar and a shoulder 45 on the seat-tube toward each other, whereby the bar is held between said nut and shoulder until the nut is loosened, whereupon the seat-frame can be independently rotated.

As it is desirable that the seat be as low as possible with respect to the elevating devices, the cross-bar is situated in the plane of the seat-frame and is recessed to receive said nut 44, which in use does not extend above the bar nor interfere with the seat. The plunger-rod bears upon the under side of the nut, which serves the double purpose of clamping the tube 8 to the cross-bar and providing a bearing for the free end of the plunger-rod.

46 indicates the platform extension of the seat-frame, and 47 is a child's foot-rest folded back in inoperative situation in a recess 48.

One of the main objects of the invention is to provide that the above-described telescoping parts shall move smoothly and without wabbling or binding. For this a plurality of guide-rods constructed and arranged as specified is very efficient. Three rods for each movable part arranged circumferentially, as shown, are very suitable, though the improvement is not limited to the particular number. As the movable sections descend at times into the oil-holder, they and their connections are thereby constantly lubricated.

The accessibility and detachability of the various parts are desirable, and novel features of construction are employed. The space occupied and the danger of breaking in transportation are thereby diminished, as also is the cost of repairs. The accessibility of the pump and its operating devices is a practically important feature. The described constructions whereby these and other advantages are secured are hereinafter pointed out, and the best forms and arrangements known to me have been set forth; but variations that involve simple mechanical skill and that have the same principles of construction and operation are not excluded.

Having described my invention, what I claim is—

1. In a dental chair, a supporting-base, a plurality of rotatable telescoping tubes, one of said telescoping tubes carrying on its interior a guide-rod fixed at both ends near its inner surface, another tube carrying on its exterior a projection movably fitting said rod, the tubes having the rod and projection respectively being movable, substantially as described.

2. In combination with seat-elevating mechanism, the fixed base, the rotatable pedestal having fixed therein a guide-rod 11, a telescoping tube 7 movably connected to said rod and carrying on its interior a rod 10, and a telescoping tube 8 movably connected with said rod 10, said tube 7 having at its foot an interior flange to hold its rod and an exterior flange to embrace the pedestal-rod, substantially as described.

3. In combination with the seat and tube elevating and lowering mechanism the telescoping tubes, flanges 12 within the exterior tube, a guide-rod 10 fixed to the said flanges, a flange 10' on the exterior of the inner telescoping tube, said rod being freely movable through the flange, and a spring situated between flange 10' and one of the flanges 12, substantially as described.

4. In combination with the tube and seat elevating and lowering mechanism, the telescoping tube 8, the telescoping tube 7 having flanges 12 at its top and bottom and a flange 11' at its bottom, the rotatable pedestal, a guide-rod fixed in the pedestal, said flange 11' being movable on the rod, a guide-rod for the telescoping tube 8 fixed to the flanges 12 inside the tube 7 and a spring 7' pendent from the foot of said tube, substantially as described.

5. In a dental chair, the combination of the base, a pedestal rotatably supported on said base and having an extension pendent therein, the wedge-block situated between the pendent part of the pedestal and the base, and devices comprising a foot-bar situated near the base to draw said wedge-block between the walls of the pedestal and base and directly against them and comprising a rod having a screw-thread connection with the wedge and a connection with the foot-bar, said devices and block being supported on and movable with the pedestal, substantially as described.

6. In a dental chair, the combination of the base, the pedestal rotatably supported on said base, the wedge-block situated between the pedestal and base, and devices to draw said wedge-block between the walls of said pedestal and base, said devices and the block being supported on and movable with the pedestal, the block-moving devices comprising a screw, a detachable screw-turning foot-bar and means for adjusting the bar with respect to the screw to compensate for wear, substantially as described.

7. In a dental chair, the combination of a pedestal, an oil-holder situated in said pedestal, a tube 8, a tube 7 both tubes being adapted to be moved into the holder, a piston-tube 33, and a pump situated adjacent the path of said tube 8, said tube 7 having an inset part 34 to permit it to descend into the oil-holder between the pump and said tube 8, substantially as described.

8. In a dental chair, the telescoping tubes 7 and 8, said tube 8 having a flange 10' and the tube 7 having flange 11' and the inset 34 cut away at 35, whereby in assembling the parts, the tube 8 after its flange has been removed to a plane above the interior flange at the foot of tube 7 can be rotated to cause the holes in the flanges to register, substantially as described.

9. In a dental chair, the combination of the pedestal, the pump, the lever having members 20 and 24 and fixed as at 22, exteriorly of the pedestal, to the fulcrum 21, said fulcrum consisting of a rod pivoted in the pedestal-wall, the short lever member 24 consisting of a sleeve secured to the said rod and provided with arms, a second rod 26 extending through said arms at their outer ends, a piston-rod 26' loosely joined to said rod 26, and returning-springs attached to the latter rod and to the pedestal, substantially as described.

10. In a dental chair, the combination of a pump, a pedestal having a door-opening, a pump-operating lever having a member rotating on a fulcrum situated in the opening and provided with bearings in the pedestal-wall, lever-returning springs, a reservoir, and a projection 28 arranged on the rotating part of the lever to engage the reservoir-wall and arrest the action of the springs, substantially as described.

11. In a dental chair, the combination of the seat-tube, the pedestal having a seat for a frusto-conical split plug, said plug, and means whereby the plug may be adjusted in its seat without moving the pedestal, substantially as described.

12. In a dental chair, the combination of the cross-bar of the seat-frame, the seat-tube provided with a shoulder 45, a nut engaging the tube above the shoulder to fasten the bar on the tube, said bar having a recess about the tube, and the nut being situated in said recess, and a plunger-rod loosely bearing on the nut, substantially as described.

In testimony whereof I have signed this specification in the presence of two subscribing witnesses.

FRANK RITTER.

Witnesses:
WILLIAM F. LYNN,
TIMOTHY J. NIGHAN.